US011808490B2

(12) United States Patent
Molavi (10) Patent No.: US 11,808,490 B2
(45) Date of Patent: Nov. 7, 2023

(54) MUFFLER WITH METALLIC MESHED RINGS

(71) Applicant: Carrier Corporation, Palm Beach Gardens, FL (US)

(72) Inventor: Anthony S. Molavi, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 835 days.

(21) Appl. No.: 16/838,776

(22) PCT Filed: Oct. 9, 2018

(86) PCT No.: PCT/US2018/054998
§ 371 (c)(1),
(2) Date: Apr. 2, 2020

(87) PCT Pub. No.: WO2019/074917
PCT Pub. Date: Apr. 18, 2019

(65) Prior Publication Data
US 2021/0080151 A1  Mar. 18, 2021

Related U.S. Application Data

(60) Provisional application No. 62/570,846, filed on Oct. 11, 2017.

(51) Int. Cl.
*F25B 1/047* (2006.01)
*F04C 29/06* (2006.01)
(Continued)

(52) U.S. Cl.
CPC .................. *F25B 1/04* (2013.01); *F16L 9/21* (2013.01); *F16L 55/0335* (2013.01); *F01N 1/08* (2013.01);
(Continued)

(58) Field of Classification Search
CPC .............. F25B 1/047; F25B 2339/047; F25B 2500/12; F16L 9/21; F16L 55/0335;
(Continued)

(56) References Cited

U.S. PATENT DOCUMENTS 3,142,354 A * 7/1964 Kammerer ............ F04B 39/005
164/109
3,263,771 A * 8/1966 Seifert .................... F24F 13/24
181/252
(Continued)

FOREIGN PATENT DOCUMENTS

CN          2327739 Y     7/1999
CN        101040119 A *   9/2007   ......... F02M 35/1211
(Continued)

OTHER PUBLICATIONS

Office Action for European Application No. 18795883.0, dated Feb. 11, 2022.
(Continued)

*Primary Examiner* — Edgardo San Martin
(74) *Attorney, Agent, or Firm* — CANTOR COLBURN LLP (57) ABSTRACT

Disclosed is a muffler for a water-cooled chiller or air-cooled of a vapor-compression or absorption refrigeration system, the muffler having: an upstream case (110) having a fluid inlet (120); a downstream case (115) connected to the upstream case at a downstream end of the upstream case, the downstream case having a fluid outlet (125); the upstream case having a plurality of axially adjacent outer muffler rings (145) and a plurality of axially adjacent inner muffler rings (155), the outer muffler rings being axially coextensive and a radially exterior to the inner muffler rings and defining a
(Continued)

fluid inlet passage (140) therebetween, wherein the outer muffler rings and inner muffler rings are a metal mesh material.

18 Claims, 9 Drawing Sheets

(51) Int. Cl.
| | |
|---|---|
| *F24F 13/24* | (2006.01) |
| *F04B 53/00* | (2006.01) |
| *F04B 39/00* | (2006.01) |
| *F25B 1/04* | (2006.01) |
| *F16L 55/033* | (2006.01) |
| *F16L 9/21* | (2006.01) |
| *F01N 1/24* | (2006.01) |
| *F01N 1/08* | (2006.01) |

(52) U.S. Cl.
CPC ............ *F01N 1/24* (2013.01); *F01N 2470/24* (2013.01); *F01N 2490/15* (2013.01); *F04C 29/063* (2013.01); *F24F 2013/242* (2013.01); *F25B 2339/047* (2013.01); *F25B 2500/12* (2013.01)

(58) Field of Classification Search
CPC .......... F01N 1/24; F01N 1/10; F01N 2470/24; F04C 29/063; F04C 29/06; F24F 2013/242; F24F 13/24; F04B 53/001; F04B 39/0027; F04B 39/0038
See application file for complete search history.

(56) References Cited

U.S. PATENT DOCUMENTS

| | | | | |
|---|---|---|---|---|
| 3,495,950 | A | * | 2/1970 | Frost .......................... F01N 3/32 60/299 |
| 3,791,483 | A | * | 2/1974 | Vasiljevic ................ F24F 13/24 181/252 |
| 3,842,932 | A | * | 10/1974 | Gibel ........................ F01N 1/10 181/258 |
| 4,134,472 | A | * | 1/1979 | Trainor ............... B01D 46/2411 181/243 |
| 5,705,777 | A | | 1/1998 | Flanigan et al. |
| 5,767,459 | A | | 6/1998 | Sell |
| 5,810,566 | A | * | 9/1998 | Pauwels ..................... F01N 1/24 181/252 |
| 6,138,791 | A | | 10/2000 | Zanzie |
| 6,622,819 | B2 | | 9/2003 | Reynolds |
| 6,799,657 | B2 | | 10/2004 | Daniels |
| 6,840,746 | B2 | | 1/2005 | Marshall et al. |
| 7,100,737 | B2 | | 9/2006 | Sishtla |
| 7,121,814 | B2 | | 10/2006 | Rockwell et al. |
| 7,185,678 | B1 | * | 3/2007 | Stell ......................... F02K 1/827 138/41 |
| 7,325,474 | B2 | * | 2/2008 | Yoshimura ............... F01N 1/003 181/258 |
| 7,753,167 | B2 | | 7/2010 | Fukano et al. |
| 7,988,427 | B2 | | 8/2011 | Patrick |
| 8,021,126 | B2 | | 9/2011 | Sishtla et al. |
| 8,132,645 | B2 | * | 3/2012 | Weber .................. F16L 55/0336 181/252 |
| 8,328,532 | B2 | | 12/2012 | Sishtla |
| 8,931,591 | B2 | * | 1/2015 | Fagerlund ........... F16L 55/0336 181/233 |
| 9,464,630 | B2 | | 10/2016 | Roman et al. |
| 9,546,660 | B2 | | 1/2017 | Lucas et al. |
| 2009/0068028 | A1 | | 3/2009 | Sishtla |
| 2009/0078498 | A1 | * | 3/2009 | Woods ...................... F01N 1/10 181/252 |

FOREIGN PATENT DOCUMENTS

| | | | | |
|---|---|---|---|---|
| CN | 101324266 | A | | 12/2008 |
| CN | 101603448 | A | | 12/2009 |
| CN | 105332894 | A | | 2/2016 |
| DE | 102011002869 | A1 | | 7/2012 |
| FR | 2854427 | A1 | * 11/2004 | ............. F01N 1/085 |
| KR | 20160010970 | A | * 1/2016 | ............... F01N 1/24 |
| WO | 2005012699 | A1 | | 2/2005 |
| WO | 2006039115 | A1 | | 4/2006 |
| WO | 2011152915 | A2 | | 12/2011 |

OTHER PUBLICATIONS

Anonymous: "Annular Ring Circular Silencers—Model 243", May 20, 2015; XP055536739; http://dbnoisereduction.com/technical_data_and_specifications/tds07_annular_ring_circular_silencers.php; p. 2.
Anonymous: "Vent Silencers Reactive-Absorptive—Model 413", Aug. 14, 2016; https://web.archive.org/web/20160814180503/; http://www.dbnoisereduction.com/techne_absorptive_vent_silencers.php; p. 2.
Notification of Transmittal of the International Search Report for International Application No. PCT/US2018/054998 Report dated Dec. 20, 2018; 7 pages.
Written opinion of the International Searching Authority for International Application No. PCT/US2018/054998; Report dated Dec. 20, 2018; 11 pages.
Chinese Office Action Issued in Chinese Application No. 201880065912.3 dated Jul. 25, 2021; 9 Pages.
International Preliminary Report on Patentability; International Application No. PCT/US2018/054998; International Filing Date Oct. 9, 2018; dated Apr. 23, 2020, 10 pages.

* cited by examiner

MUFFLER WITH METALLIC MESHED RINGS

CROSS REFERENCE TO RELATED APPLICATIONS

This application is a U.S. National Stage Application of PCT/US2018/054998 filed Oct. 9, 2018, which claims the benefit of U.S. Provisional Application No. 62/570,846 filed Oct. 11, 2017, both of which are incorporated by reference in their entirety herein.

BACKGROUND

Exemplary embodiments pertain to the art of mufflers for water-cooled or air-cooled chillers and more specifically for muffler rings within the mufflers.

A chiller is a machine that removes heat from a liquid via a vapor-compression or absorption refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. Chillers may have mufflers where the muffler canister assemblies (or mufflers) may be manufactured with polypropylene or fiberglass muffler rings. Such rings may have beads or particles that may deteriorate over time and clog system orifices, filter-drier(s) or strainer(s). Also, decaying of polypropylene or fiberglass rings may result in increased noise level of the chiller.

BRIEF DESCRIPTION

Disclosed is a muffler for a water-cooled chiller or air-cooled of a vapor-compression or absorption refrigeration system, the muffler having: an upstream case having a fluid inlet; a downstream case connected to the upstream case at a downstream end of the upstream case, the downstream case having a fluid outlet; the upstream case having a plurality of axially adjacent outer muffler rings and a plurality of axially adjacent inner muffler rings, the outer muffler rings being axially coextensive and a radially exterior to the inner muffler rings and defining a fluid inlet passage therebetween, wherein the outer muffler rings and inner muffler rings are a metal mesh material.

In addition to one or more of the features described above, or as an alternative, further embodiments may include that one or both of the outer muffler rings and inner muffler rings are steel.

In addition to one or more of the features described above, or as an alternative, further embodiments may include that one or both of the outer muffler rings and inner muffler rings are stainless steel.

In addition to one or more of the features described above, or as an alternative, further embodiments may include that one or both of the outer muffler rings and inner muffler rings are SAE 304A stainless steel.

In addition to one or more of the features described above, or as an alternative, further embodiments may include that one or both of the outer muffler rings and inner muffler rings are 0.008 inch wall thickness type SAE 304A stainless steel with a mesh density of twelve (12) percent and a weight of 6.23 ounces.

In addition to one or more of the features described above, or as an alternative, further embodiments may include that the upstream case includes N sets of muffler rings, the N sets of muffler rings being axially aligned and radially spaced to provide N−1 fluid passages therein, wherein N is greater than or equal to 3.

In addition to one or more of the features described above, or as an alternative, further embodiments may include that the upstream case is a primary upstream case and the muffler includes a secondary upstream case fluidly connected to the primary upstream case proximate a downstream end of the primary upstream case, the secondary upstream case including a plurality of axially adjacent muffler rings that are a metal mesh material.

In addition to one or more of the features described above, or as an alternative, further embodiments may include that the secondary muffler case includes a plurality of the secondary upstream cases each fluidly connected to the primary upstream case proximate the downstream end of the upstream case.

In addition to one or more of the features described above, or as an alternative, further embodiments may include that the secondary muffler case includes N sets of muffler rings, the N sets of muffler rings being axially aligned and radially spaced to provide N−1 fluid passages therein, wherein N is greater than or equal to 3.

Further disclosed is a heating or cooling system including: a chiller the having a muffler with one or more of the above disclosed features.

Yet further disclosed is a method of operating a chiller system, the chiller system including a muffler, the muffler further including an upstream case having a fluid inlet, a downstream case connected to the upstream case at a downstream end of the upstream case, the downstream case having a fluid outlet, the upstream case having a plurality of axially adjacent outer muffler rings and a plurality of axially adjacent inner muffler rings, the outer muffler rings being axially coextensive and a radially exterior to the inner muffler rings and defining a fluid inlet passage therebetween, and wherein the outer muffler rings and inner muffler rings are a metal mesh material, the method including: muffling noise so that over an octave band of 80 Hz to 130 Hz, a sound pressure level is between approximately 78 dBA-Wtg and approximately 80 dBA-Wtg.

In addition to one or more of the features described above, or as an alternative, further embodiments may include that muffling noise over a one third octave band, from static to 1000 Hz, results in an average sound pressure level of 81.7 dBA.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
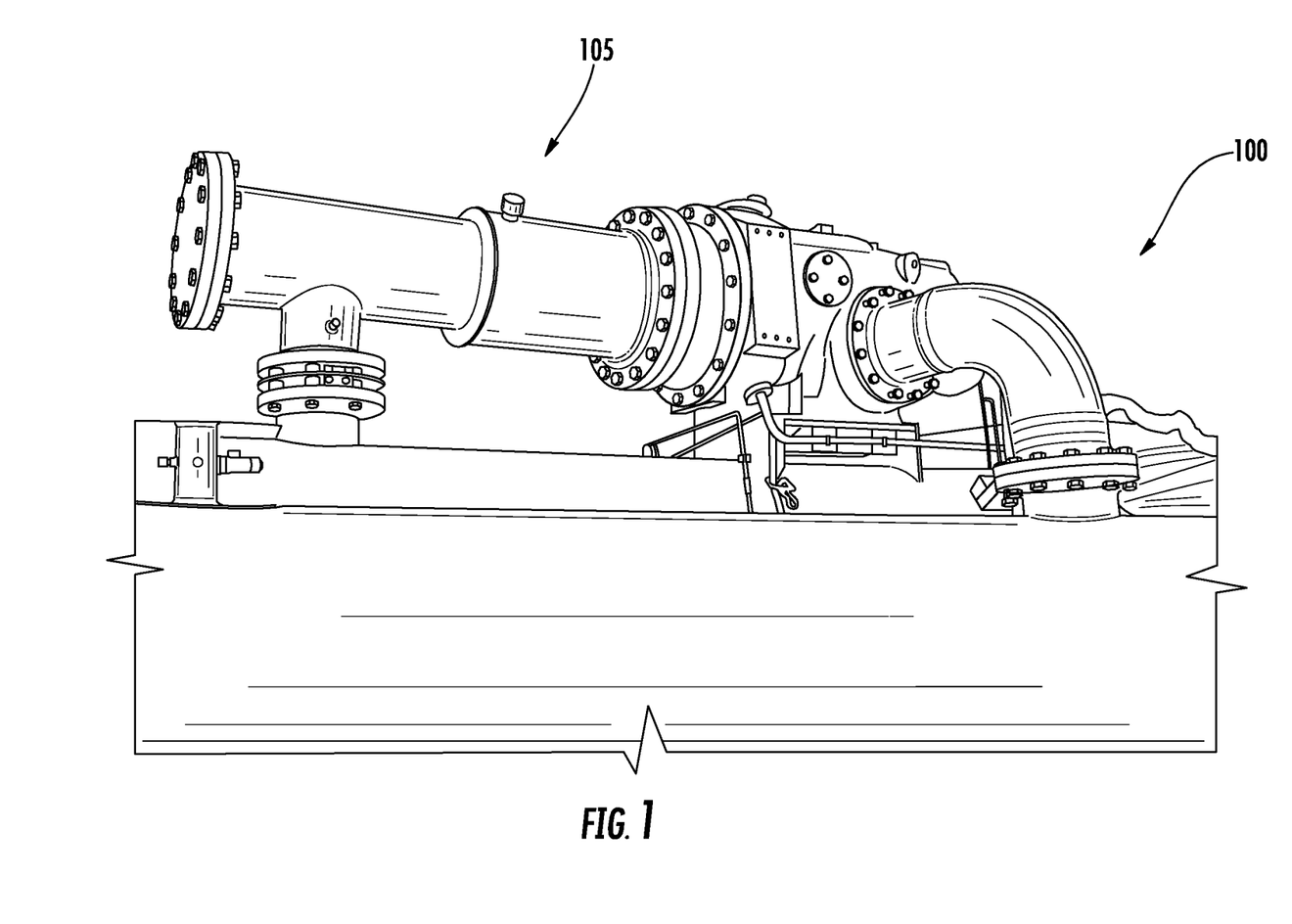
FIG. 1 illustrates a portion of a chiller assembly having a muffler canister assembly (or muffler) according to an embodiment.

FIG. 1 illustrates a portion of a chiller assembly (or chiller) 100, which may take the form of Chiller Model 23XR4747ERVAA50 water-cooled variable speed screw chiller by Carrier Corporation, which is a brand of the Climate, Controls and Security division of United Technologies Corporation (UTC). The chiller 100 may have a muffler canister assembly (or muffler) 105.

Figure 2:
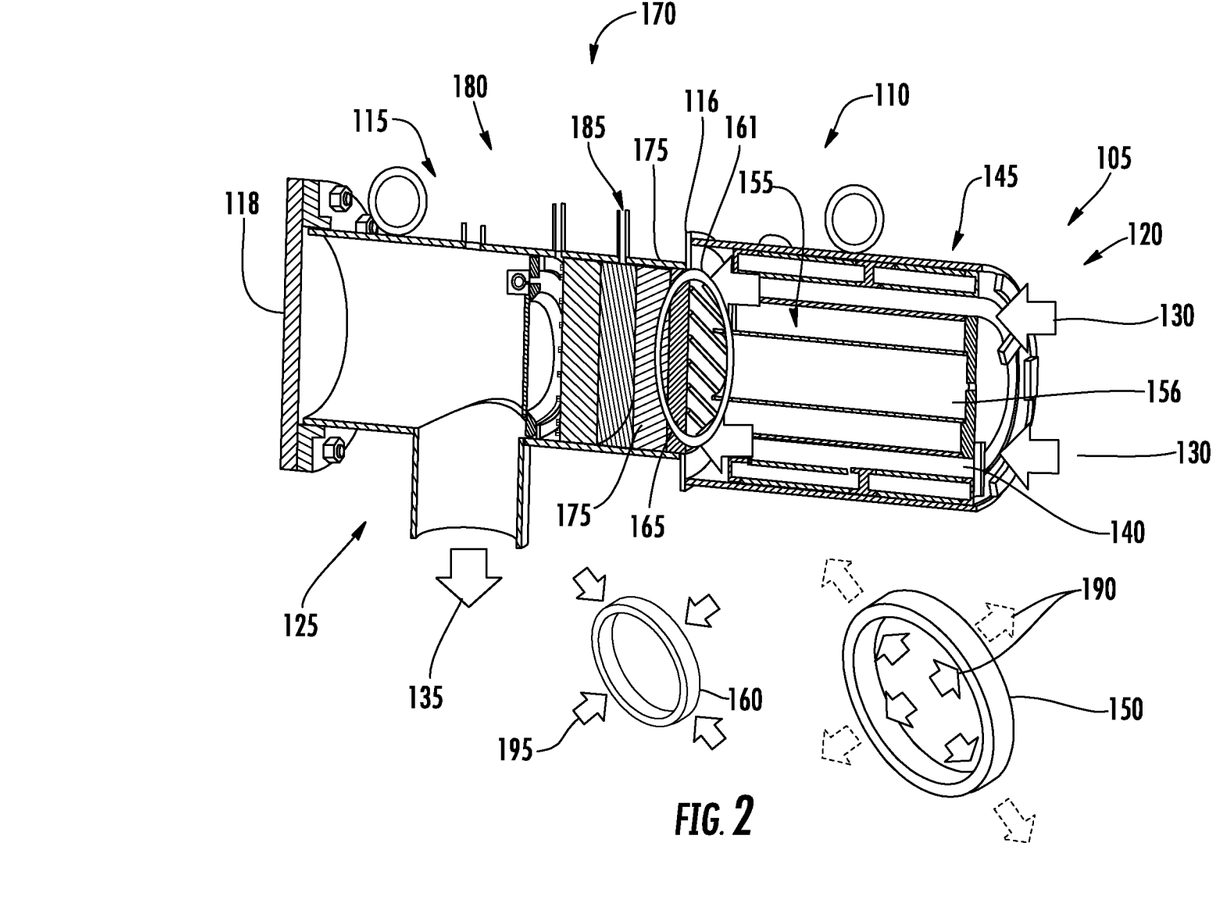
FIG. 2 illustrates a cross-sectional view of muffler according to an embodiment.
Figure 3:
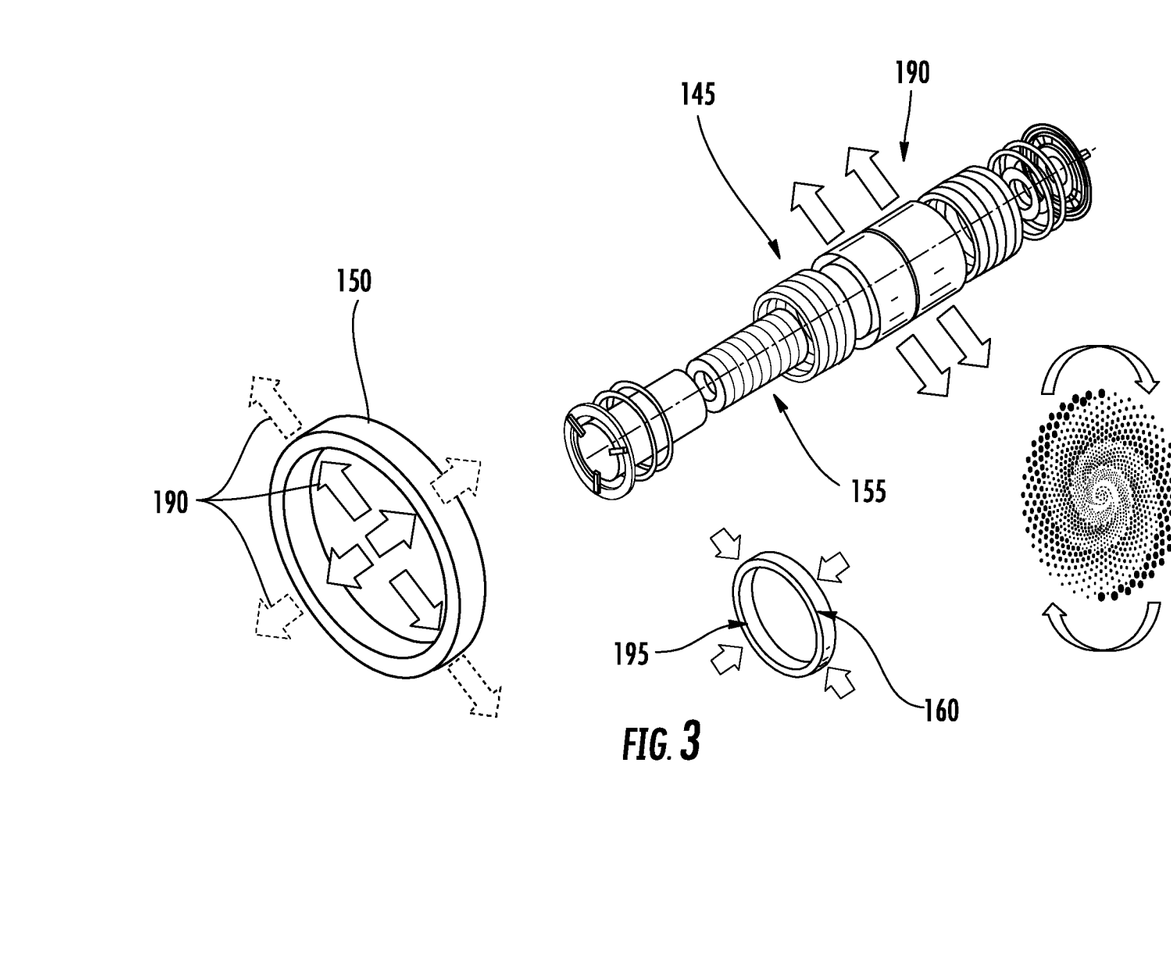
FIG. 3 illustrates a muffler according to an embodiment.

As illustrated in FIGS. 2 and 3 the muffler 105 may have an upstream case 110 with a first diameter and a first length, and a downstream case 115 with a second diameter and a second length. The second diameter may be smaller than the first diameter. A muffler inlet 120 may be in the upstream case 110 and a muffler outlet 125 may be in the downstream case 115. The inlet 120 may be disposed in the axial direction and the outlet 125 may extend in the radial direction and be located in an axially intermediate position of the downstream case 115 between an upstream end 116 of the downstream case and a downstream end 118 of the downstream case. Inlet flow 130 and outlet flow 135 are also illustrated.

Inlet flow passage 140 may be defined between a plurality of outer muffler rings (or outer rings) 145 including first outer ring 150 having a third diameter and a plurality of inner muffler rings (or inner rings) 155 including first inner ring 160 having a fourth diameter. The plurality of outer muffler rings 145 may be axially coextensive with the plurality of inner muffler rings 155 along the span of the upstream case 110. The resulting structure from the outer rings 145 may form an acoustic absorbing outer wall. The plurality of inner rings 155 may form an internal damping cavity 156 and the structure is sometimes referred to as an acoustic bullet.

A blast area 161 may be located at the axial intersection 165 of the upstream case 110 and downstream case 115. Axially between the blast area 161 and the outlet 125, and within the downstream case 115 may be a plurality of flow effecting chambers 170 including first chamber 175 (which may include additional layers of metallic rings). In the same axial location there may be a plurality of exhaust ports 180 including first exhaust port 185. The chambers 170 may be axially adjacent and may have an outer diameter defined by the inner diameter of the downstream case 115.

Pressure from the blast area 161 may tend to pull part the outer rings 145 as illustrated by arrows 190. The same pressure may tend to crush inner rings 155 as illustrated by arrows 195. To accommodate these pressures 190, 195 the rings 145, 155 may be fabricated from metal mesh. For example the rings 145, 155 may be manufactured from stainless steel, more specifically type SAE 304A stainless steel, yet more specifically 0.008 inch wall thickness type SAE 304A stainless steel with a mesh density of twelve (12) percent and a weight of 6.23 ounces. This material configuration however is not limiting. The use of metals having materials similar to the standard identified under SAE304 but with various wall thicknesses and/or densities is possible, as well as and Aluminum with various wall thicknesses and/or densities for lower sound levels.

Figure 4:
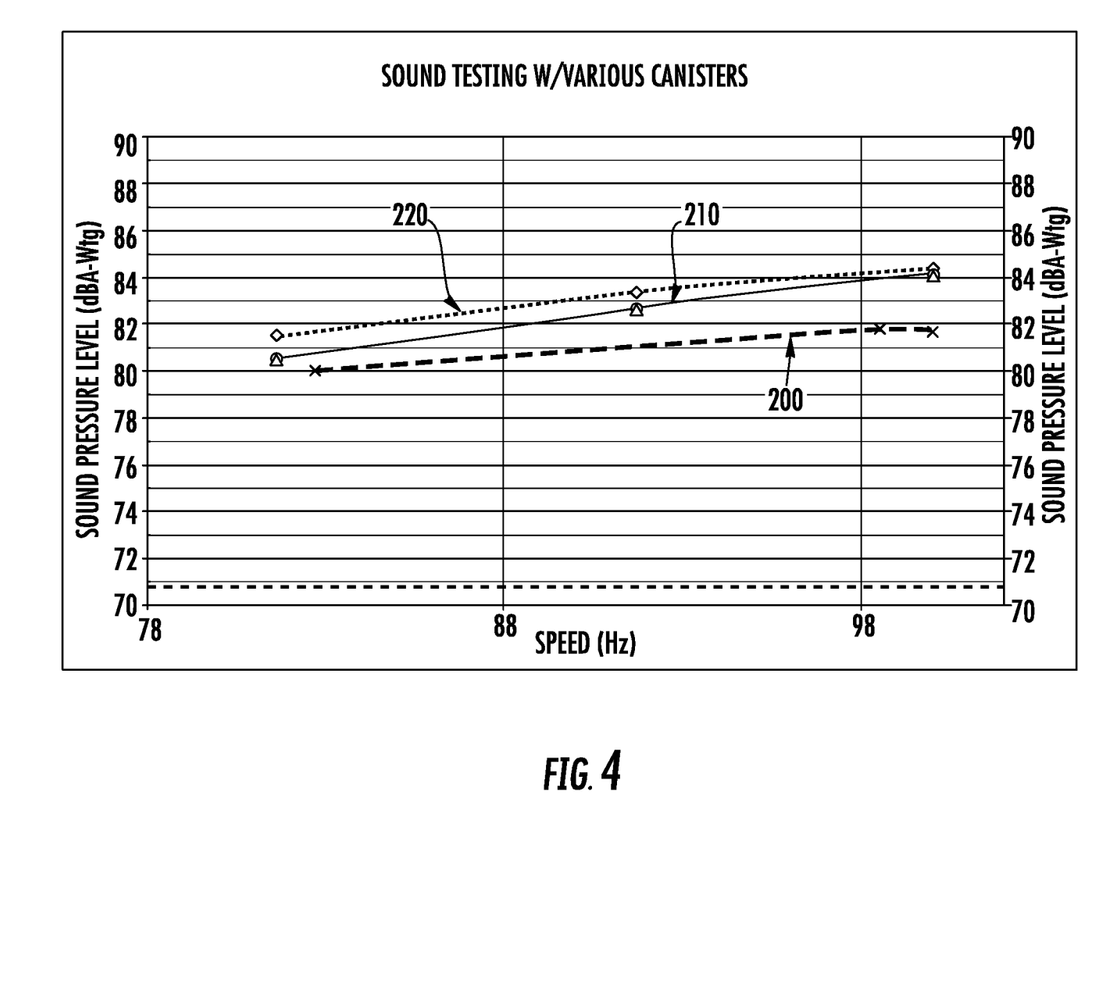
FIG. 4 graphs results from testing chillers with mufflers of different materials including a muffler according to an embodiment.

Illustrated in FIG. 4, the above noted Chiller Model 23XR4747ERVAA50 was tested on different occasions with mufflers 105 fitted with either fiberglass muffler rings 145, 155, polypropylene muffler rings 145, 155 or metal mesh muffler rings 145, 155. Throughout operating speeds of approximately 80 to 100 Hz, the chiller having the muffler 105 with metal mesh muffler rings 145, 155 produced consistently lower noise than the counterpart tests. More noise was produced by the chiller having the muffler 105 with polypropylene muffler rings 145, 155 and yet more noise was produced by the chiller having the muffler 105 configured with fiberglass muffler rings 145, 155.

Remaining with FIG. 4, for the chiller having the muffler 105 with metallic mesh muffler rings 145, 155 the sound pressure level (SPL) was measured as being between approximately 80 dBA-Wtg ("A-weighted") and approximately below 82 dBA-Wtg as illustrated by graph line 200. For the chiller having the muffler 105 with polypropylene muffler rings 145, 155 the SPL was between approximately 80.5 dBA-Wtg and approximately below 84 dBA-Wtg as illustrated by graph line 210. For the chiller having the muffler 105 with fiberglass muffler rings 145, 155 the measured SPL was between approximately 81.5 dBA-Wtg and approximately 84.5 dBA-Wtg as illustrated by graph line 220.

Figure 5:
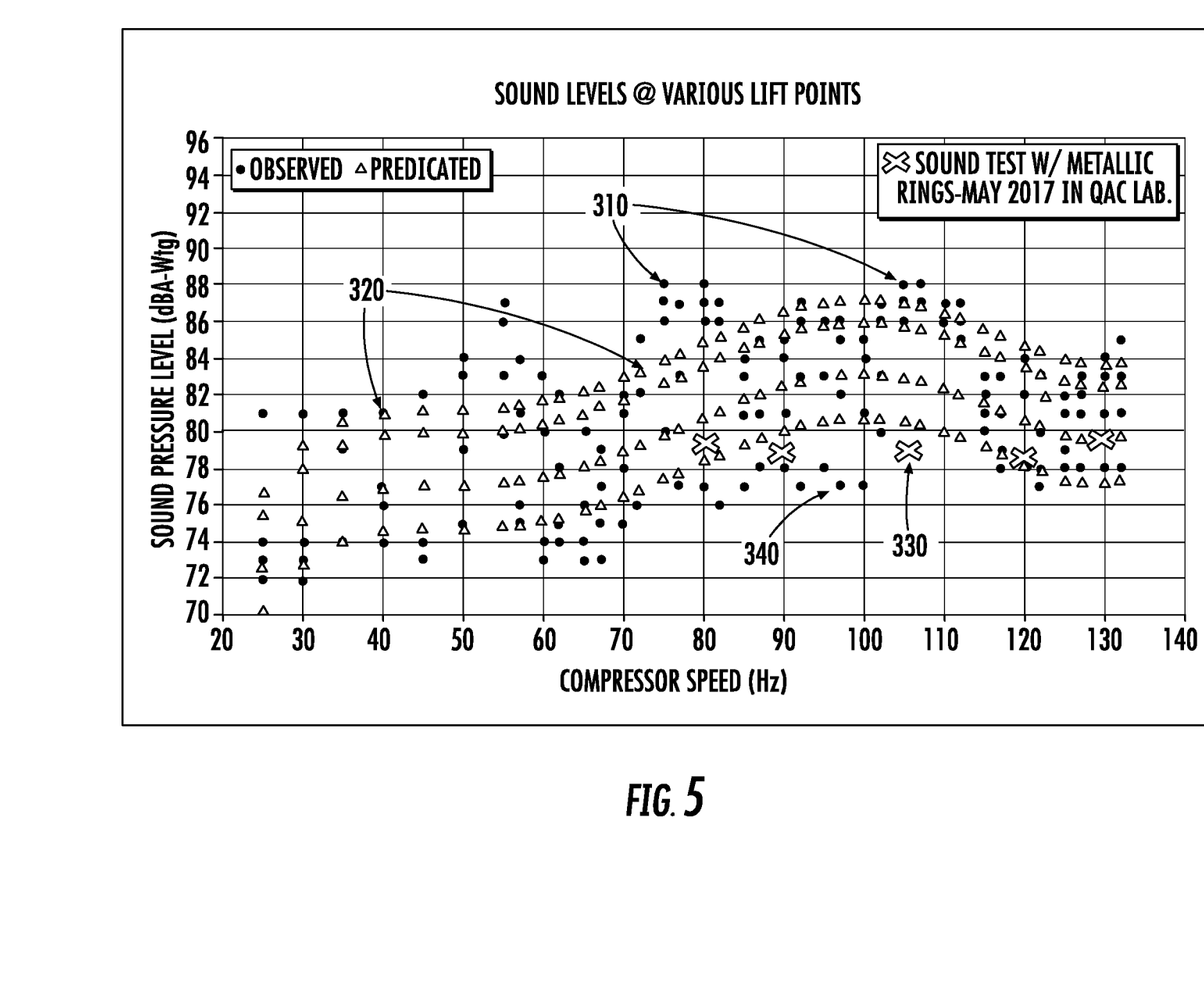
FIG. 5 graphs results from testing chillers with mufflers of different materials including a muffler according to an embodiment.

As illustrated in FIG. 5, similar tests performed over a speed range of approximately 25 Hz to approximately 135 Hz and the results were compared against predicted results. For the chiller having the muffler 105 with polypropylene muffler rings 145, 155 the measured SPL was recorded and graphed with circular markers 310. The predicted results for the same configuration are graphed with triangular markers 320. For the chiller having the muffler 105 with metal mesh muffler rings 145, 155 "X" markers 330 illustrate both SPL predicted and actual results. As FIG. 5 illustrates, the chiller having the mufflers 105 with metallic mesh rings 145, 155 had SPLs that were more predictable and more consistently lower than the alternatives. Though some measurements 340 of the polypropylene configuration provided lower SPL at speed, those measurements skewed far from predicted results, were not consistent, and were in the area of predicted resonance. These results 340 were therefore not reliable and could not be reasonably expected of being repeated at any given run.

Remaining with FIG. 5, damped resonance was predicated and observed with the chiller having the muffler 105 with polypropylene muffler rings 145, 155 at, and around, approximately 100 Hz. In comparison no resonance was predicted or observed in the test speed range with the chiller having the mufflers 105 fitted with the metallic mesh muffler rings 145, 155. As illustrated, muffling noise over an octave band of 80 Hz to 130 Hz provided a sound pressure level of between approximately 78 dBA-Wtg and approximately 80 dBA-Wtg. In addition to being quieter, one of ordinary skill would appreciate that metallic mesh muffler rings 145, 155 and components with fluid and mechanical connections therewith will last longer when not subjected to resonance.

Figure 6:
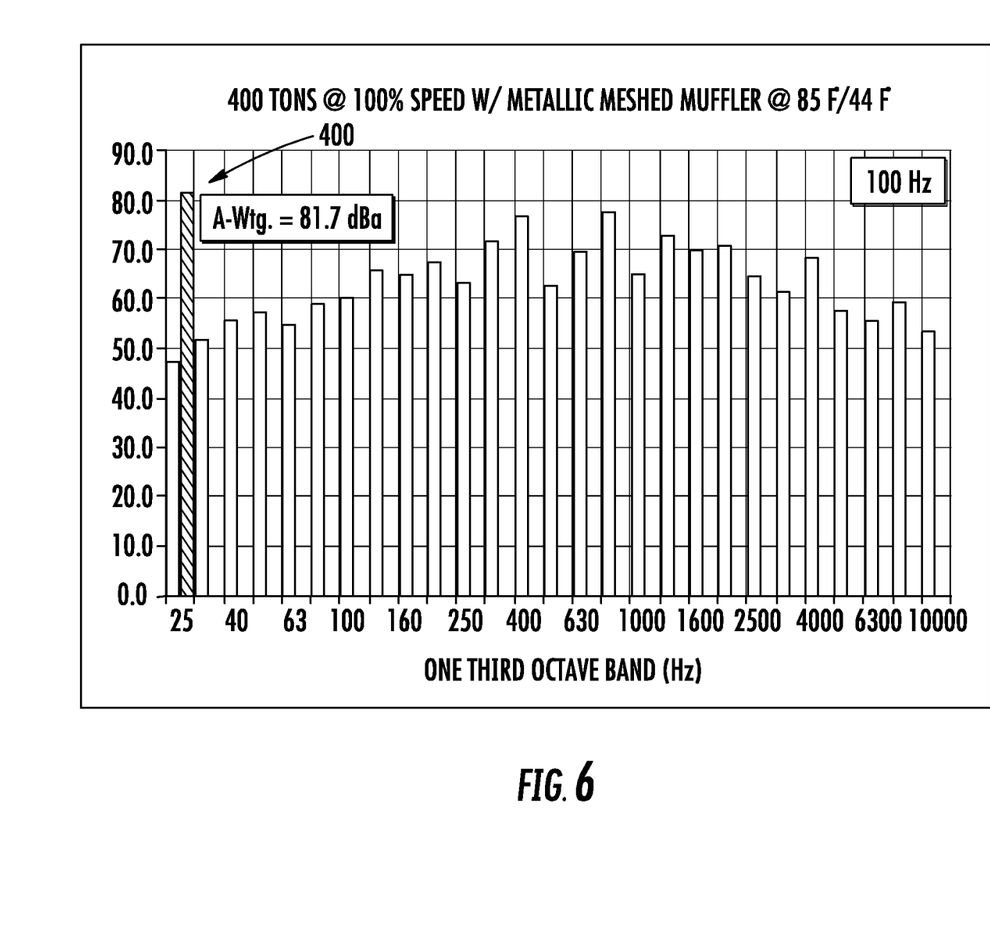
FIG. 6 graphs results from testing a chiller with a muffler according to an embodiment.

Turning to FIG. 6, the graph line 400 illustrates that over a one third octave band, from static to 1000 Hz, the average SPL for the chiller having the muffler 105 with metallic mesh muffler rings is 81.7 dBA. Test conditions for the measurements taken in FIG. 6 were 100% speed at 85 degrees Fahrenheit at the inlet of condenser and 44 degrees Fahrenheit at the outlet of the evaporator. This sound level is lower than the sound level that exists at the low end of the tested speed range for the chiller having the muffler with the fiberglass muffler rings 145, 155 in FIG. 4. In addition, this sound level is below at least two-thirds of the sound levels sensed in the tested speed range for the chiller having the muffler with the polypropylene muffler rings 145, 155 in FIG. 4.

In comparison with polypropylene muffler rings or fiberglass muffler rings, metallic mesh muffler rings may be superior. Metallic mesh muffler rings may provide for better sound muffling as indicated by the above data. In addition, there may be a much lower likelihood of metallic rings burning during welding steps of the muffler manufacturing processes. Further, metallic mesh muffler rings may have a lower likelihood of deteriorating and clogging orifices or filter-driers and may be more durable and last longer. In addition, metallic mesh muffler rings may have a higher melting temperature and tensile strength. Metallic mesh muffler rings may have a lower chance of becoming saturating with refrigerant and oil and may be less likely to have compatibility issue with refrigerants and oils. Moreover the assembly cost of mufflers using metallic mesh muffler rings may be lower as the muffler rings are easy to manufacture and manipulate and the material is more readily available. Mufflers with metallic mesh muffler rings may be used with at least pneumatic tools, compressors, blow-off valves, small engines and catalysts.

Figure 7:
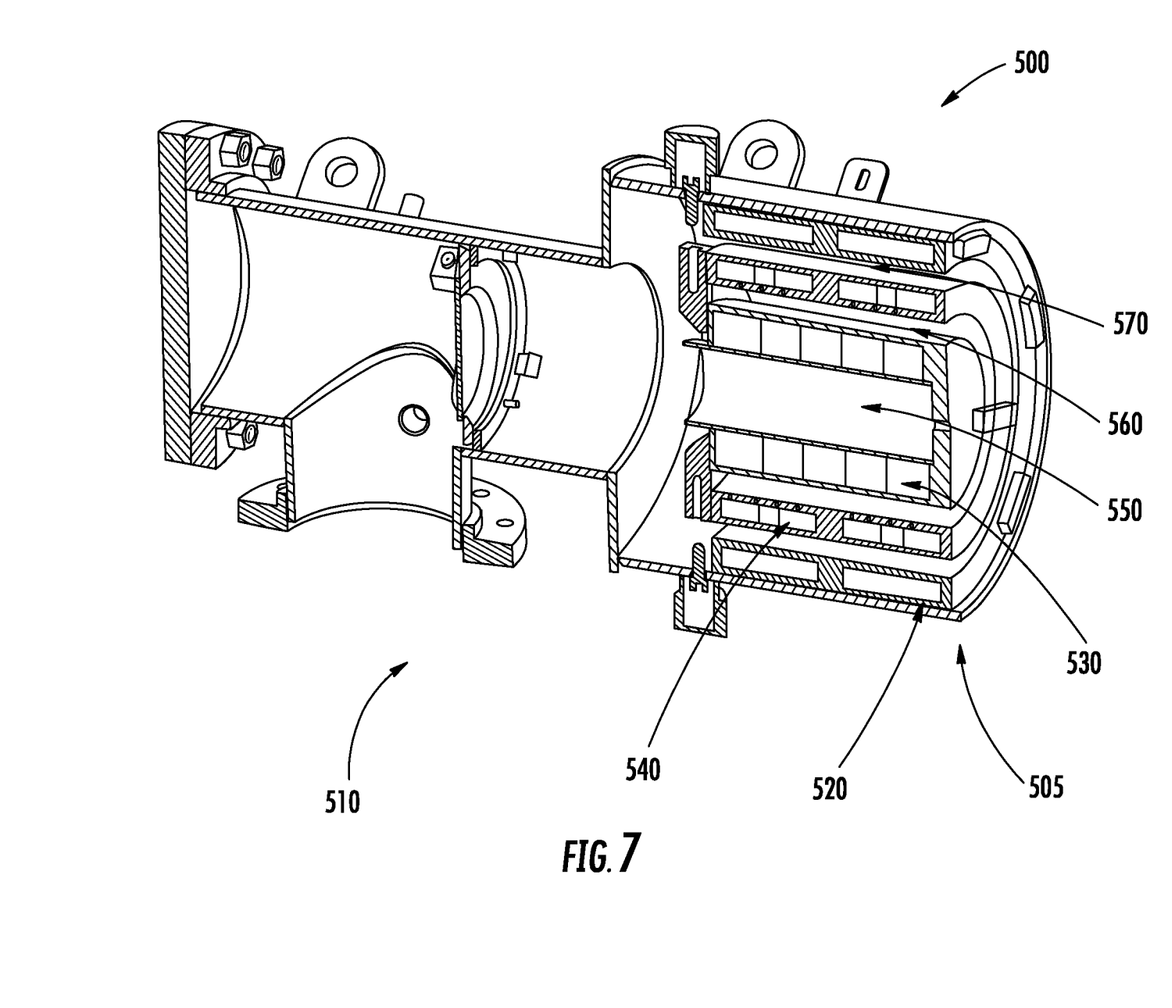
FIG. 7 illustrates a cross-sectional view of muffler according to an embodiment.

Turning to FIG. 7, alternative muffler assembly 500 is illustrated. The muffler assembly 500 includes an upstream case 505 and a downstream case 510. The downstream case 510 is substantially similar to the previously disclosed downstream case 115. The upstream case 505 differs from the above disclosed upstream case 110 in that the upstream case has a plurality of layers of muffler rings including outer muffler rings 520, inner muffler rings 530 and an intermediate set of muffler rings 540 which are radially between the outer muffler rings 520 and inner muffler rings 530. This configuration provides a center chamber 550 and two flow passages 560, 570, axially aligned and radially spaced between the three sets of muffler rings 520, 530, 540. As illustrated the first passage 560 is between the set of inner muffler rings 530 and intermediate muffler rings 540. The second passage 570 is between the set of outer muffler rings 520 and intermediate muffler rings 540.

The embodiment of FIG. 7 provides N sets of axially aligned and radially spaced muffler rings and N−1 sets of axially aligned and radially spaced flow passages. While the materials of the embodiment in FIG. 7 are the same as the materials of the embodiment in FIG. 1, this configuration results in specifically desired output sound effects based on desires noise dampening.

Figure 8:
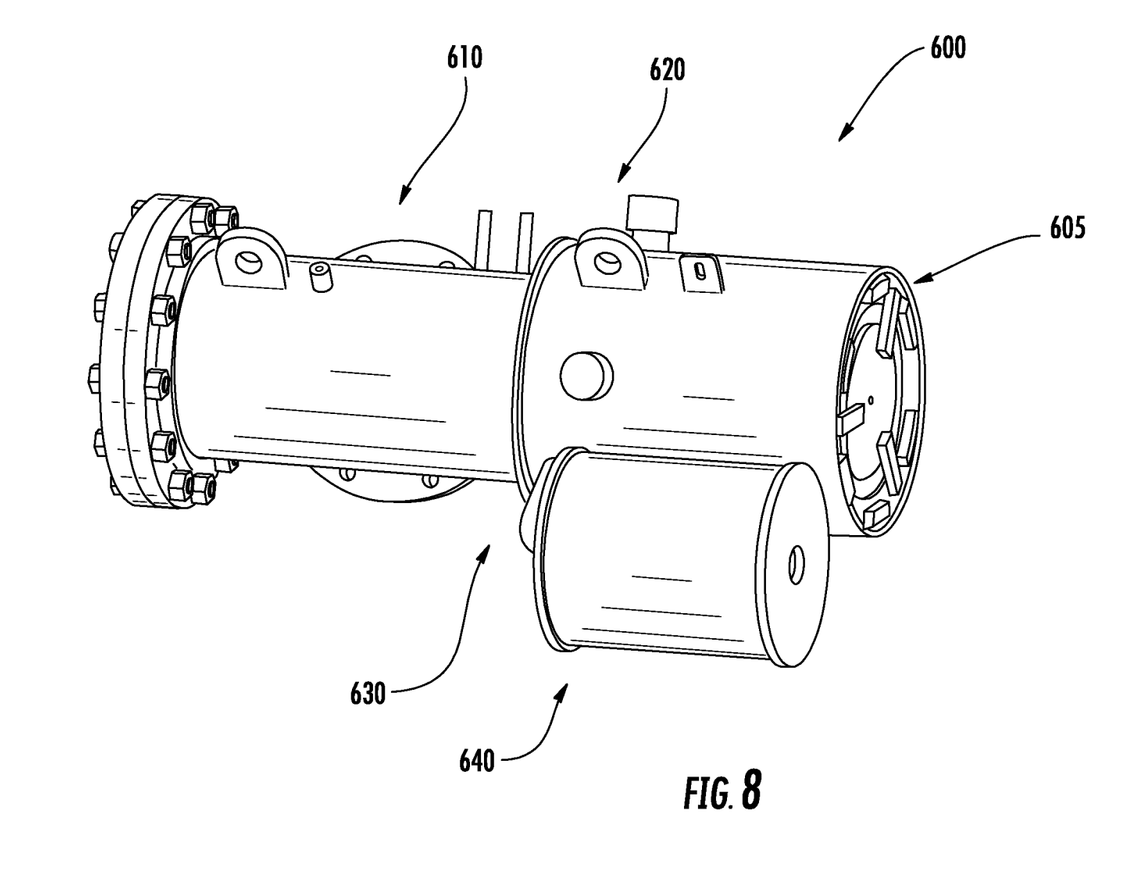
FIG. 8 illustrates a perspective view of muffler according to an embodiment.
Figure 9:
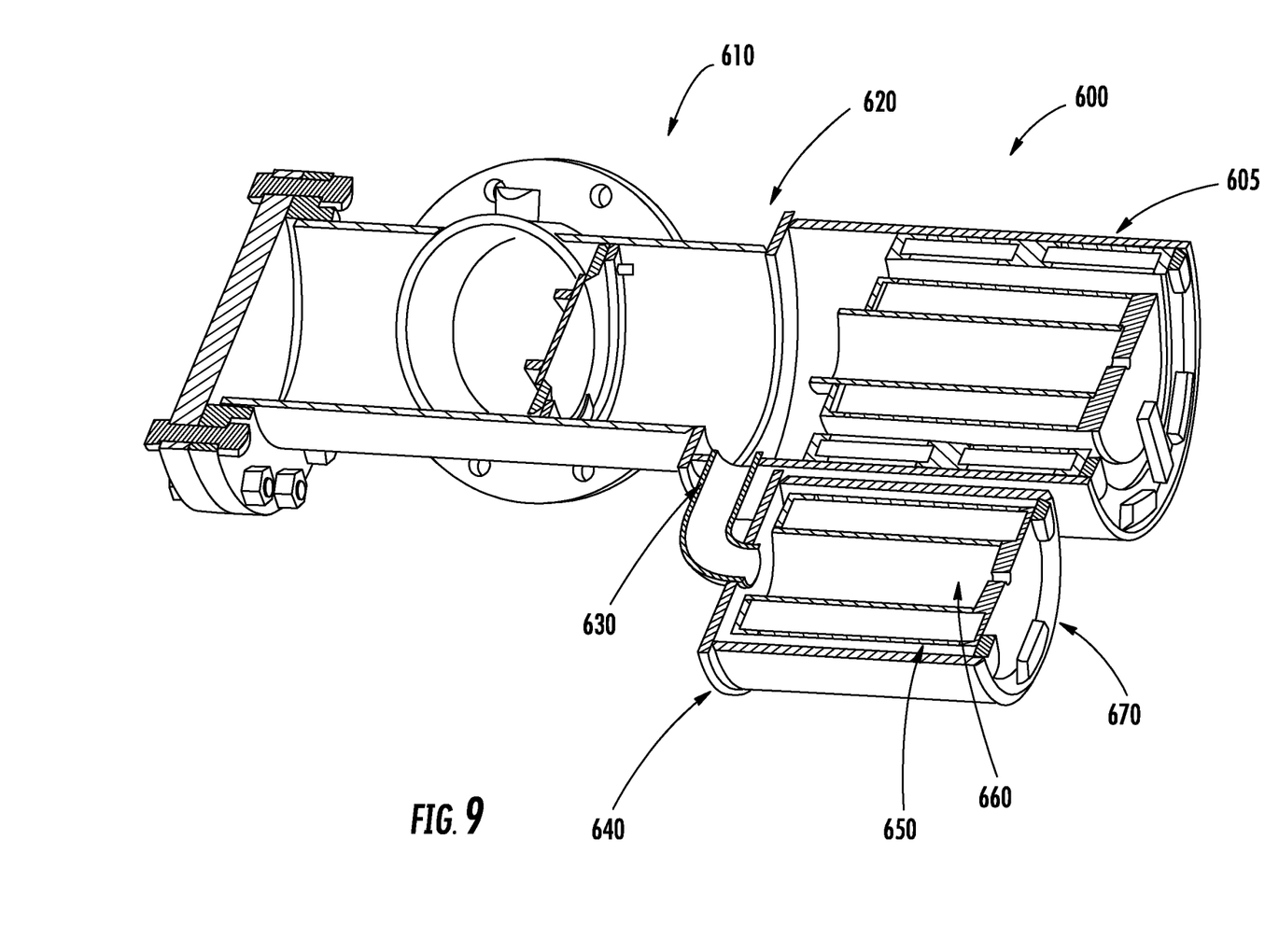
FIG. 9 illustrates a cross-sectional view of muffler according to an embodiment.

In the embodiments in FIGS. 8 and 9, an alternative muffler assembly 600 is illustrated. The muffler assembly 600 includes an upstream case 605 and a downstream case 610. The downstream case 610 is substantially similar to the previously disclosed downstream case 115. The upstream case 605 differs from the above disclosed upstream case 110 in that proximate the downstream end 620 of the upstream case 605 is an inlet 630 through which a secondary muffler assembly 640 is fluidly connected. The secondary muffler assembly 640 may have one set of internal muffler rings 650 surrounding a center muffler chamber 660, or the configuration of the secondary muffler assembly 640 may be similar to one of the above disclosed embodiments with respect to the upstream cases 110, 505. The materials in the secondary muffler assembly 640 may be the same as those in the above disclose upstream case 110. An upstream inlet 670 to the secondary muffler assembly 640 may be fed by a secondary branch feed (not illustrated) from the chiller 100.

The embodiment of FIGS. 8 and 9 provide a plurality of upstream muffler cases configured to provided muffler damping characteristics that when combined result in damping characteristics that may be more precisely tuned than one upstream case could provide in a given set of design constraints. In addition, one or more secondary upstream muffler cases could be retrofitted into an active chiller system as needed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A muffler for a chiller of a vapor-compression or absorption refrigeration system, the muffler comprising:
   an upstream case having a fluid inlet;
   a downstream case connected to the upstream case at a downstream end of the upstream case, the downstream case having a fluid outlet;
   the upstream case having a plurality of axially adjacent outer muffler rings and a plurality of axially adjacent inner muffler rings, the outer muffler rings being axially coextensive and a radially exterior to the inner muffler rings and defining a fluid inlet passage therebetween, wherein the outer muffler rings and inner muffler rings are a metal mesh material,
   wherein the upstream case is a primary upstream case and the muffler includes a secondary upstream case fluidly connected to the primary upstream case proximate a downstream end of the primary upstream case, the secondary upstream case including a plurality of axially adjacent muffler rings that are a metal mesh material.

2. The muffler of claim 1 wherein one or both of the outer muffler rings and inner muffler rings are steel.

3. The muffler of claim 2 wherein one or both of the outer muffler rings and inner muffler rings are stainless steel.

4. The muffler of claim 3 wherein one or both of the outer muffler rings and inner muffler rings are SAE 304A stainless steel.

5. The muffler of claim 4 wherein one or both of the outer muffler rings and inner muffler rings are 0.008 inch wall thickness type SAE 304A stainless steel with a mesh density of twelve (12) percent and a weight of 6.23 ounces.

6. The muffler of claim 1 wherein the upstream case comprises N sets of muffler rings, the N sets of muffler rings being axially aligned and radially spaced to provide N−1 fluid passages therein, wherein N is greater than or equal to 3.

7. The muffler of claim 1 wherein the secondary muffler case comprises a plurality of the secondary upstream cases each fluidly connected to the primary upstream case proximate the downstream end of the upstream case.

8. The muffler of claim 1 wherein the secondary muffler case includes N sets of muffler rings, the N sets of muffler rings being axially aligned and radially spaced to provide N−1 fluid passages therein, wherein N is greater than or equal to 3.

9. A system comprising:
a chiller comprising a muffler, the muffler comprising:
an upstream case having a fluid inlet;
a downstream case connected to the upstream case at a downstream end of the upstream case, the downstream case having a fluid outlet; and
the upstream case having a plurality of axially adjacent outer muffler rings and a plurality of axially adjacent inner muffler rings, the outer muffler rings being axially coextensive and a radially exterior to the inner muffler rings and defining a fluid inlet passage therebetween, wherein the outer muffler rings and inner muffler rings are a metal mesh material,
wherein secondary upstream case fluidly connected to the primary upstream case proximate a downstream end of the primary upstream case, the secondary upstream case including a plurality of axially adjacent muffler rings that are a metal mesh material.

10. The system of claim 9 wherein one or both of the outer muffler rings and inner muffler rings are steel.

11. The system of claim 10 wherein one or both of the outer muffler rings and inner muffler rings are stainless steel.

12. The system of claim 11 wherein one or both of the outer muffler rings and inner muffler rings are SAE 304A stainless steel.

13. The system of claim 12 wherein one or both of the outer muffler rings and inner muffler rings are 0.008 inch wall thickness type SAE 304A stainless steel with a mesh density of twelve (12) percent and a weight of 6.23 ounces.

14. The system of claim 9 wherein the upstream case comprises N sets of muffler rings, the N sets of muffler rings being axially aligned and radially spaced to provide N−1 fluid passages therein, wherein N is greater than or equal to 3.

15. The system of claim 9 wherein the secondary muffler case comprises a plurality of the secondary upstream cases each fluidly connected to the primary upstream case proximate the downstream end of the upstream case.

16. The system of claim 9 wherein the secondary muffler case includes N sets of muffler rings, the N sets of muffler rings being axially aligned and radially spaced to provide N−1 fluid passages therein, wherein N is greater than or equal to 3.

17. A method of operating a chiller system, the chiller system comprising a muffler,
the muffler further comprising:
an upstream case having a fluid inlet,
a downstream case connected to the upstream case at a downstream end of the upstream case, the downstream case having a fluid outlet,
the upstream case having a plurality of axially adjacent outer muffler rings and a plurality of axially adjacent inner muffler rings, the outer muffler rings being axially coextensive and a radially exterior to the inner muffler rings and defining a fluid inlet passage therebetween, and wherein the outer muffler rings and inner muffler rings are a metal mesh material,
wherein the upstream case is a primary upstream case and the muffler includes a secondary upstream case fluidly connected to the primary upstream case proximate a downstream end of the primary upstream case, the secondary upstream case including a plurality of axially adjacent muffler rings that are a metal mesh material,
the method comprising:
muffling noise so that over an octave band of 80 Hz to 130 Hz, a sound pressure level is between approximately 78 dBA-Wtg and approximately 80 dBA-Wtg.

18. The method of claim 17, wherein muffling noise over a one third octave band, from static to 1000 Hz, results in an average sound pressure level of 81.7 dBA.

* * * * *